United States Patent

[11] 3,588,885

| [72] | Inventor | Doyle H. Schaal<br>Ponca City, Okla. |
|---|---|---|
| [21] | Appl. No. | 744,471 |
| [22] | Filed | July 12, 1968 |
| [45] | Patented | June 28, 1971 |
| [73] | Assignee | Continental Oil Company<br>Ponca City, Okla. |

[54] APPARATUS FOR INDICATING GRAPHIC COORDINATE VALUES
12 Claims, 3 Drawing Figs.

[52] U.S. Cl. ................................................. 340/347,
235/154
[51] Int. Cl. .............................................. H03k 13/02
[50] Field of Search .......................................... 340/347;
235/154, 183; 178/18, 20; 33/1 (M)

[56] References Cited
UNITED STATES PATENTS

| 3,042,911 | 7/1962 | Paradise et al. | 340/347 |
| 3,050,718 | 8/1962 | Giel | 340/347 |
| 3,188,455 | 6/1965 | Quick, Sr. | 340/347X |
| 3,211,897 | 10/1965 | Kaufman | 340/347X |
| 3,487,204 | 12/1969 | Emmerich | 235/183 |

Primary Examiner—Maynard R. Wilbur
Assistant Examiner—Charles D. Miller
Attorneys—Joseph C. Kotarski, Henry H. Huth, Jerry B. Peterson, William J. Miller, David H. Hill and Craig and Antonelli ABSTRACT: Apparatus for sensing and maintaining an accurate count of coordinate values of a plot or graph, the apparatus consisting of variable potential means for equating an electrical value to the graph coordinate under consideration and differential amplifier means for generating an output indicative of change of the electrical values, the amplifier output then being employed through pulse and counting circuitry to register a count indicative of unit change of the electrical value. The amount of unit change required to actuate the pulse and counter circuitry is variable over wide range to provide ready adjustment of the apparatus for use over various graduated scales.

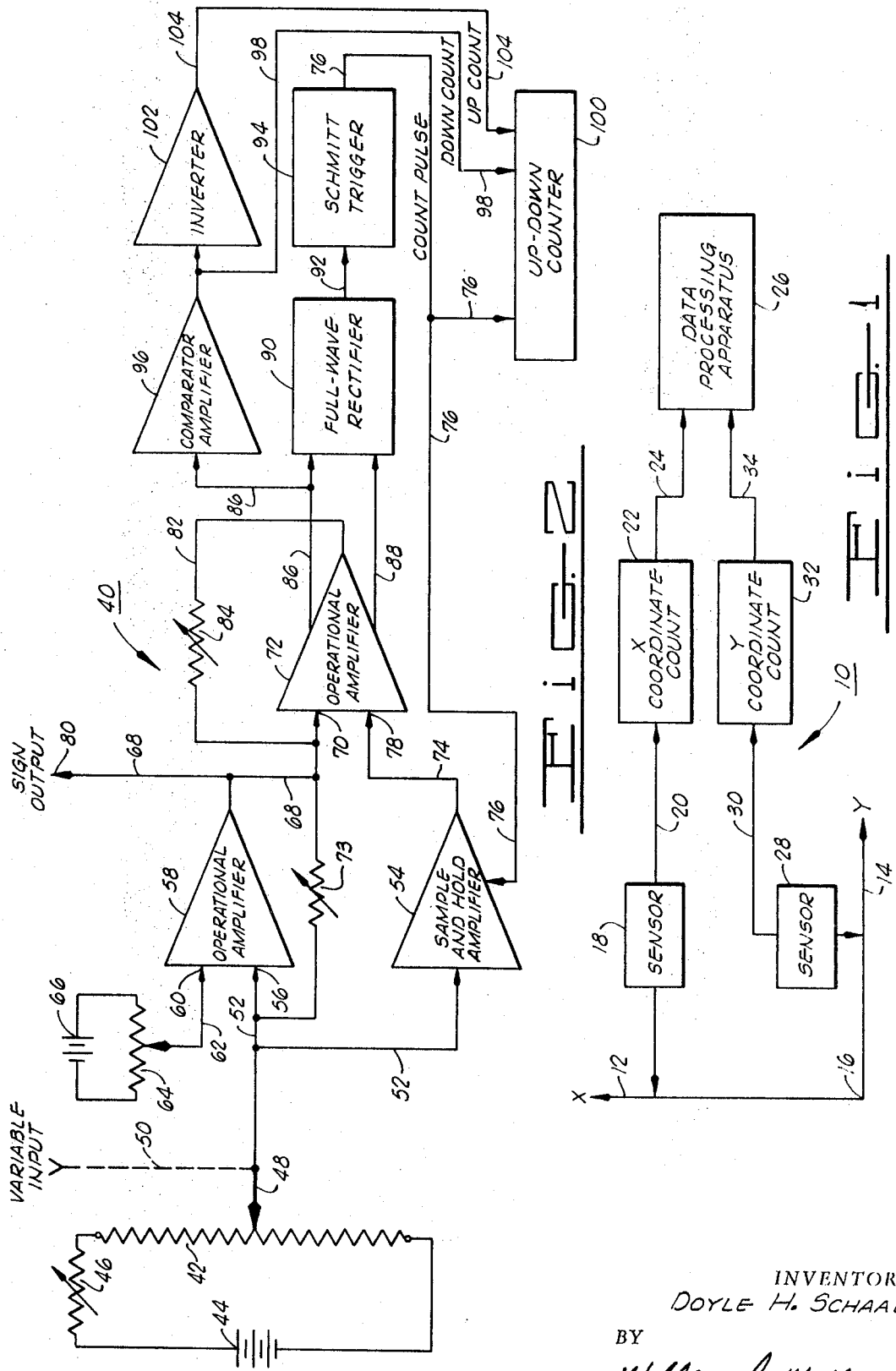

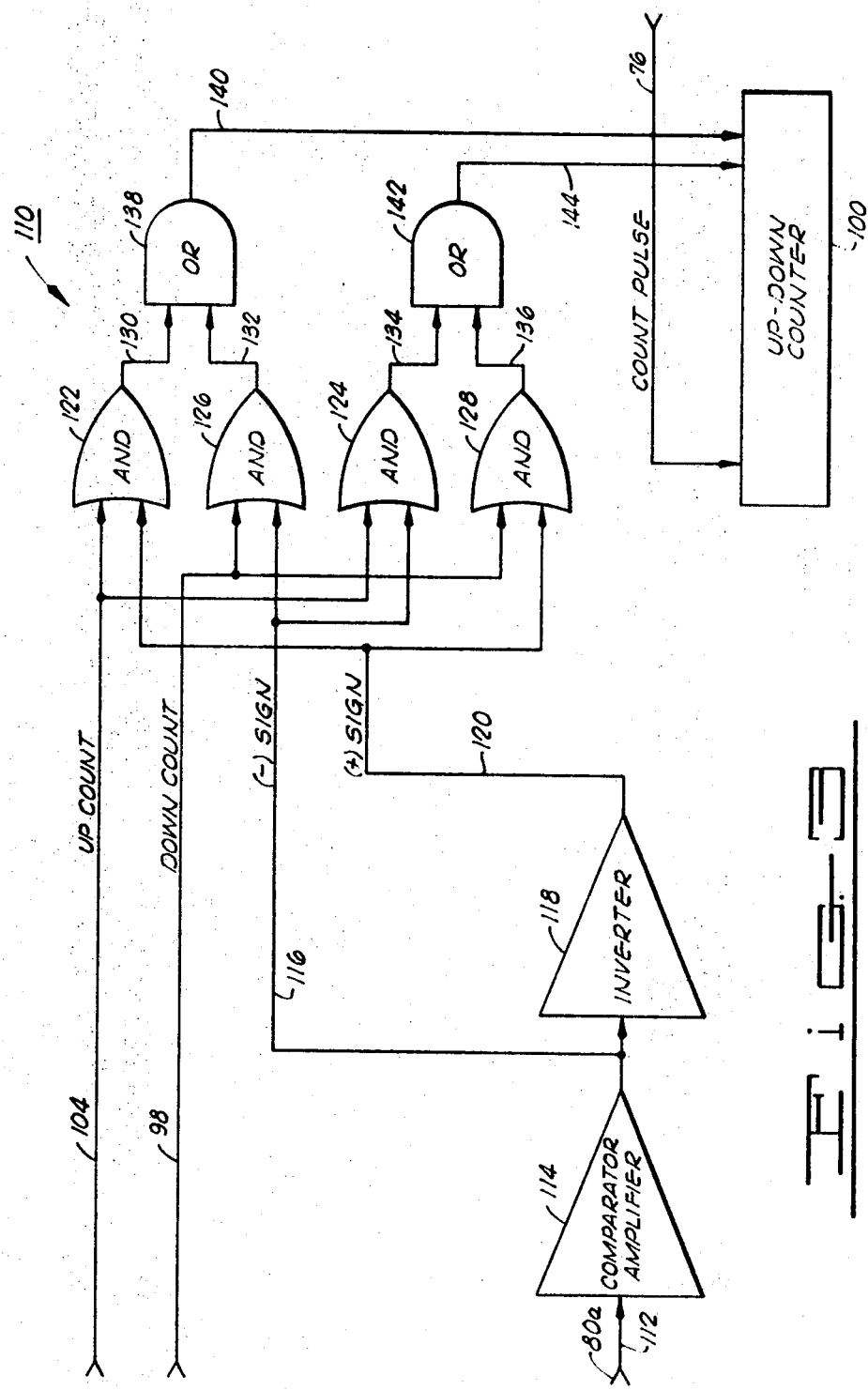

3,588,885

APPARATUS FOR INDICATING GRAPHIC COORDINATE VALUES

BACKGROUND OF THE INVENTION

1. Field of the Invention

The relates generally to count indicating devices and, more particularly, but not by way of limitation, it relates to an improved counting device for reading the coordinates of a plot or graph and providing an output count indication.

2. Description of the Prior Art

The prior art includes two general types of coordinatograph. A first type employs a digital volt meter or similar type of device for measuring the analog voltage across a slide wire or potentiometer which is equated to a graph axis. A second type employs an encoder disc or some form of fixed scale pulse generator which is variable in proportion to a graphic scale, and a pulse counter is then employed to indicate or record variations. The prior type devices are all relatively complex and obtained only at considerable expense, factors which become limiting for certain applications.

SUMMARY OF THE INVENTION

The present invention contemplates a graph reading indicator which can be employed to provide a numerical count of values along a coordinate. In a more limited aspect, the invention consists of variable resistance means for equating proportional electrical output values to a coordinate of a plot or graph, a variation in graph reading effects changing of the electrical values tapped off and this is applied to a differential amplifier means which develops and error voltage indicative of change as read out from the graph. The output error voltage is then employed to actuate a counter mechanism for each preselected amount of change in electrical value. Additional comparator circuitry enables determination of sense and sign of change indications so that algebraic counting of graphic values through four quadrants may also be effected.

Therefore, it is an object of the present invention to provide a device for reading the coordinates of a plot or graph in a form which is usable by a computer or other data handling device.

It is also an object of the invention to provide such a coordinate reading device which, while being relatively simple and inexpensive of construction, has the capabilities of variable scale factor over a relatively large range as well as fast operation with high reliability.

Finally, it is an object of the invention to provide a graph value readout device which may be used to provide graphic count information of selected magnitude and polarity for input to very high speed data processing apparatus.

Other objects and advantages of the invention will be evident from the following detailed description when read in conjunction with the accompanying drawings which illustrate the invention.

BRIEF DESCRIPTION OF THE DRAWINGS

FIG. 1 is a generalized block diagram of a dual coordinatograph system;

FIG. 2 is a block diagram of a form of graphic value readout circuit in accordance with the present invention; and FIG. 3 is a block diagram of logic circuitry which can be employed with the readout circuitry of FIG. 2 to enable algebraic count of the readout.

DESCRIPTION OF THE PREFERRED EMBODIMENT

The block diagram of FIG. 1 shows one form of graphic readout device 10 as it might be utilized for reading out a plot of data relative to an X-axis 12 and a Y-axis 14 with respect to origin 16. Graduated values along X-axis 12 may be read out by a suitable sensor 18 which provides an output on a lead 20 that is proportional to the X-axis value. The proportional output on lead 20 is then applied to a suitable form of X-axis coordinate count device 22 whereupon electrical output indicative of the sensed X-axis value is present on a lead 24 to a data processing apparatus 26.

In like manner, a sensor 28 derives a proportional indication of X-axis value on a lead 30 for application to a Y coordinate count device 32. The Y coordinate count 32 provides an output on lead 34 to data processing apparatus 26 which is indicative of a particular sensed Y value along Y-axis 14. The data processing apparatus 26 may be a computer or any of various other data handling devices, either digital or analog. In either case, the appropriate digital or analog signal preparation devices would be supplied at the respective X and Y coordinate inputs to the data processing apparatus 26.

Referring now to FIG. 2, a graphic scale readout device 40 is capable of reading data values from one coordinate of a plot. Thus, a resistance element 42, such as a slide wire or such, is allowed to represent a particular plotted coordinate under consideration. The resistance element 42 is energized across its entire length by means of a suitable DC potential source 44 in series with a calibration adjustment potentiometer 46. The potential of potential source 44 is selected in accordance with the amount of definition or resolution required, and the size of scale adjustment potentiometer 46 should be correlatively considered so that sufficiently large scale factor is included. A wiper element 48 in contact with resistance element 42 is movable as by a motion input via linkage 50 to vary the resistance proportioning of resistance element 42 in accordance with a counterpart graphic or graduated scale. Thus, motion on linkage 50 may be derived from an element which is made to follow a previously plotted graph which is coordinated with resistance element 42, or linkage 50 may be actuated directly from a plotting element during data reception.

A voltage indication from wiper element 48 is conducted on an input 52 for parallel application to each of a sample and hold amplifier 54 and a first differential input 56 of an operational amplifier 58. The operational amplifier 58 includes a second differential input 60 which receives a reference voltage input via lead 62 from a zero adjustment potentiometer 64 as energized by a DC potential source 66. The operational amplifier 58 may be a conventional form of operational amplifier which provides an output on a lead 68 for input to a differential input 70 of a next successive operational amplifier 72. A feedback resistor 73 provides adjustable feedback from the output of amplifier 58 to the inverting input 52, this adjustment serving to match the gain of amplifier 58 with that of sample and hold amplifier 54. The sample and hold amplifier 54 is a conventional type as often employed in multiplexing and other time-sharing applications. The sample and hold amplifier 54 is energized via input on lead 54 but it functions, e.g. as by capacitor storage or such, to hold the output on lead 74 to the previous value until enabled by a count pulse present on lead 76, as will be further described below. Output lead 74 from sample and hold amplifier 54 is supplied to a remaining differential input 78 of operational amplifier 72. The alternate input lead 68 also provides a signal output 80 which is further utilized as will be described.

The operational amplifier 72 may also be a conventional form of such amplifier utilizing a feedback loop 82 through a scale adjustment potentiometer 84 with return through differential input 70. A differential output from operational amplifier 72 is taken between a pair of output leads 86 and 88 which are applied to a full wave rectifier 90 to derive a DC error voltage on an output lead 92. A Schmitt trigger circuit 94, a conventional form of voltage level sensing circuit, receives lead 92 at its input and it is so adjusted that it will provide a count pulse output via lead 76 whenever the error voltage from the full wave rectifier 90 exceeds a predetermined voltage level. This voltage level is a matter of choice, depending upon the calibration and matching of scale factor in the circuitry. Thus, with scale potentiometers 46 and 84 set in predetermined manner, and with the threshold level of the Schmitt trigger 94 set at a known value, each counter pulse output will represent a specific distance along the graduated scale represented by resistance element 42.

The output of operational amplifier 72 as taken between leads 86 and 88 is full-wave rectified in rectifier 90 so that either sense of output will trigger the same form of count pulse for output on lead 76 to an up-down counter 100. In order to differentiate the sense of count, a comparator amplifier 96 is connected to receive input from differential output lead 86 of operational amplifier 72 to establish a proper order of counting. Thus, the output can be taken directly from comparator amplifier 96 via a lead 98 for application as a down count pulse to the up-down counter 100. The same output from comparator amplifier 96 can then be conducted through a phase inverter 102 whereupon its output is applied on lead 104 as an up count input to the up-down counter 100. Thus, each actual count is enabled by input of the count pulse on lead 76, while direction of count registration is controlled by down count input on lead 98 or, alternatively, up count input via lead 104. The up-down counter 100 may be a conventional form of electronic circuit, many forms of which are readily available to the skilled artisan. For example, both binary and binary coded decimal up-down counter circuits are discussed fully and shown schematically in technical literature entitled "Digital Flip Chip Modules" available from Digital Equipment Corporation of Maynard, Mass.

While the counting device 40 of FIG. 2 suffices for up and down counting of graphic scale value where the sign factor is known, utilization of logic circuitry 110 of FIG. 3 enables further utilization in situations where it is necessary to maintain an algebraic summation or subtraction of successive graphic scale values. For example, in the case where X and Y coordinates are arranged in four quadrants with the origin at the center, the well-known cartesian coordinates, it is necessary to maintain both sense and sign of each value to maintain orderly progression of scale values through all quadrants. Thus, up count and down count on respective leads 104 and 98 as derived from comparator amplifier 96 and differential output 86 (FIG. 2), are supplied to the logic circuit 110 for consideration along with a plus or minus sign indication which must also be derived from the error circuitry.

Sign indication may be derived from the output of operational amplifier 58 (FIG. 2) as available at sign output terminal 80. Referring again to FIG. 3, connection is made to an input 80A for application via a lead 112 for input to a comparator amplifier 114. The comparator amplifier 114 of conventional type is biased to give alternate forms of conduction in response to either a negative or a positive input via lead 112. A first output selected for negative sign indication can be taken off from the output of comparator amplifier 114 via a lead 116 whereupon its counterpart positive sign indication will be generated by further passage through an inverter 118 for output on a positive sign indication lead 120. The up count input lead 104 is applied to respective inputs of AND gate circuits 122 and 124 while down count input on lead 98 is applied to AND gate circuits 126 and 128. Sign indicator inputs are then varied as negative sign input on lead 116 is applied to each of AND gate circuits 126 and 124 while positive sign inputs on lead 120 are applied to AND gate circuits 122 and 128.

A true or coincidence input to any of AND gate circuits 122—128 will provide an output on their respective leads 130, 132, 134 and 136. Outputs on leads 130 and 132 are conducted through a conventional form of OR gate circuit 138 for application via a lead 140 to control algebraically increasing count of up-down counter 100. That is, either a positive up count or a negative down count will pass through OR gate 138 to provide a pulse on lead 140 to cause increase of count in counter 100. Similarly, negative up count or positive down count will cause pulse output through an OR gate 142 via lead 144 to actuate algebraically decreasing count in up-down counter 100.

OPERATION

Referring now to FIG. 2, the graphic scale can be readout by first equating the scale to the energized resistance element 42 thereafter allowing count output. The counter 100 is first set to zero and, at the same time, the inputs 56 to operational amplifier 58 and lead 52 to sample and hold amplifier 54 are set to zero so that the counter will follow subsequent movement of the wiper 48. In the event that the graphic scale starts at zero and positive values only are to be counter, the zero potentiometer 64 is set at the same potential as the voltage output from wiper 48 when it is moved to the bottom or zero end of the resistance element 42.

Following of the graphic value by wiper element 48 then results in a voltage change on lead 52 such that a differential output is developed in operation amplifier 58 while sample and hold amplifier 54 is so energized but holding its output. This disparity in operation results in a differential voltage across differential inputs 70 and 78 to operational amplifier 72 such that a further differential or error voltage is developed between output leads 86 and 88. Voltage energization on lead 86 is amplified in a comparator amplifier 96 to ascertain the sense of voltage change. That is, whether it is increasing or decreasing relative to the zero or starting point. These outputs are developed for application on leads 98 and 104 to enable down count or up count, respectively, in up-down counter 100.

The differential voltage value between leads 86 and 88 is also rectified in rectifier 90 and, if the variation is great enough in magnitude, Schmitt trigger 94 is energized to provide an output count pulse via lead 76 to the up-down counter 100. The count pulse on lead 76 is also conducted back to the sample and hold amplifier 54 to enable or effect release of its held value, thus changing the output value on output leads 74 to the input 78 of operational amplifier 72. At this point, the differential input to operational amplifier 72 will again be negligible or zero resulting in no differential output between leads 86 and 88, and allowing the release of Schmitt trigger circuit 94.

The foregoing constitutes one count or one cycle of the counter operation. The amount of distance or graphic count which can be equated to a single count of counter 100 can be adjusted by setting of the scale factor potentiometers 46 and 84 as these actually provide for an infinitely variable scale factor. That is, the increment of distance represented by each pulse may be varied by controlling either the gain of operational amplifier 72 with the feedback potentiometer 84, or by varying the scale adjustment potentiometer 46 to change the amount of voltage which is applied across the resistance element 42.

The logic circuit 110 is employed where it is desirable to readout a graphic scale while providing count output in algebraic progression; that is, count registration in response to both sign and sense as in the case of a Cartesian coordinate system. Up or down count signals are applied in on respective leads 104 and 98 and these are further qualified as to sign by sign inputs on leads 116 and 118 to respective ones of AND gate circuits 122 —128. Sense count is simply the up or down indication as derived from output lead 86 of operational amplifier 72 while the sign count is derived from operational amplifier 58. Thus, input 60 (zero input) of operational amplifier 58 is adjusted to represent the origin of the graphic scale such that the output of operational amplifier 58 will indicate scale movement in the plus or minus direction. As shown in FIG. 3, sign input on lead 112 (from lead 68 and output terminal 80) is applied to a comparator amplifier 114 which provides a negative sign indication on lead 116 and a positive sign indication on inverter output lead 120. The AND gates 122 —128 then differentiate as to sign and sense whereupon outputs are conducted through respective OR gates 138 or 142 for application on respective leads 140 and 144 to either increase or decrease (algebraically) the count of up-down counter 100.

The foregoing discloses a novel coordinatograph device for reading out graphic values, the device being susceptible of relatively simplified construction as compared to presently known types of equipment for similar applications. Even though simplified, the device still maintains a high degree of speed capability as well as the property of having a wide variation of readily adjustable scale factor. The relative simplicity of the overall apparatus contributes to the further factors of high reliability and economical cost and maintenance.

Changes may be made in the combination and arrangement of elements as heretofore set forth in the specification and shown in the drawings; it being understood that changes may be made in the embodiments disclosed without departing from the spirit and scope of the invention as defined in the following claims.

I claim:

1. A device for readout of points along a graduated scale, comprising:
    sensor means providing electrical values indicative of each of successive points along said graduated scale;
    a reference potential source;
    first amplifier means having a first input connected to receive said reference potential and a second input receiving said successive electrical values in generating a first differential output;
    sample and hold means receiving said successive electrical values to provide an output indicative of a previous successive value until enabled to provide an output indicative of the next successive value;
    second amplifier means receiving said first differential output and said sample and hold output at respective differential inputs to generate said error signal output;
    rectifier means receiving said error signal output and providing a rectified error voltage;
    pulse means to be actuated by an error voltage of greater than preset amplitude to generate a count output pulse; and
    counter means to be actuated by said count output pulse to register a count indication which is equatable to a change of points along said graduated scale.

2. A device as set forth in claim 1 wherein said sensor means comprises:
    resistance means having a variable resistance output;
    a potential source connected across and energizing said resistance means; and
    means for moving said variable resistance output in coordination with a change in points along said graduated scale.

3. A device as set forth in claim 1 wherein said pulse means comprises: Schmitt trigger means which provides a pulse output when said error voltage input exceeds a preset amplitude.

4. A device as set forth in claim 1 which is further characterized to include:
    feedback means connecting said count output pulse from said pulse means for control input to the sample and hold means to enable output of the next successive electrical value.

5. A device as set forth in claim 1 wherein said counter means comprises:
    an up-down counter means for registering successive increasing or decreasing values along said graduated scale.

6. A device as set forth in claim 1 which is further characterized to include:
    comparator means receiving said error signal output from said amplifier means to provide a first sense output indicative of an increase along said graduated scale and a second sense output indicative of a decrease along said graduated scale.

7. A device as set forth in claim 6 wherein said counter means comprises:
    an up-down counter means receiving said count output pulse at a count input, receiving said first sense output at a first enabling input to enable count increase, and receiving said second sense output at a second enabling output to enable count decrease.

8. A device as set forth in claim 1 which is further characterized to include:
    first comparator means receiving said error signal output from said second amplifier means to generate a first sense output in response to an increase in count and a second sense output in response to a decrease in count;
    second comparator means receiving said first differential output from said first amplifier means to generate a first sign output indicative of values positive with respect to zero and a second sign output indicative of values negative with respect to zero; and
    logic circuitry receiving each of said first and second sense outputs and said first and second sign outputs to generate first and second counter enable outputs for controlling algebraic addition and subtraction of said counter means.

9. A device for readout of points along a graduated scale, comprising:
    sensor means providing an electrical output indicative of a point on said graduated scale;
    means for moving said sensor means to successive points along the scale;
    amplifier means including sample and hold circuitry for receiving electrical output from said sensor means at successive points and generating an error signal output while said sample and hold circuitry output is disabled;
    rectifier means receiving said error signal output to generate a rectified error voltage;
    Schmitt trigger means actuated by a preset amplitude error of said voltage to provide a count pulse output;
    counter means actuated by said count pulse output to register a count change which is equatable to points on said graduated scale; and
    feedback means energized by said Schmitt trigger means to enable said amplifier means sample and hold circuitry for response to a next successive change in said electrical output from the sensor means.

10 A device as set forth in claim 9 which is further characterized to include:
    comparator means receiving said error signal output from said amplifier means to provide a first sense output indicative of an increase along said graduated scale and a second sense output indicative of a decrease along said graduated scale.

11. A device as set forth in claim 10 wherein said counter means comprises:
    an up-down counter means receiving said count pulse output at a count input, receiving said first sense output at a first enabling input to enable count increase, and receiving said second sense output at a second enabling input to enable count decrease.

12. A device as set forth in claim 9 which is further characterized to include:
    first comparator means receiving said error signal output from said amplifier means to generate a first sense output in response to an increase in count and a second sense output in response to a decrease in count;
    second comparator means receiving said error signal output from said amplifier means to generate a first sign output indicative of values positive with respect to zero and a second sign output indicative of values negative with respect to zero; and
    logic circuitry receiving each of said first and second sense outputs and said first and second sign outputs to generate first and second counter enable outputs for controlling algebraic addition and subtraction of said counter means.